Jan. 16, 1945.　　　　　T. A. RICH　　　　　2,367,614
REGENERATIVE FLUXMETER
Filed July 10, 1943

Inventor:
Theodore A. Rich,
by Harry E. Dunham
His Attorney.

Patented Jan. 16, 1945

2,367,614

UNITED STATES PATENT OFFICE 2,367,614

REGENERATIVE FLUXMETER

Theodore A. Rich, Schenectady, N. Y., assignor to General Electric Company, a corporation of New York Application July 10, 1943, Serial No. 494,205

6 Claims. (Cl. 171—95)

My invention relaties to a fluxmeter arrangement which utilizes regenerative fluxmeter action for the purpose of changing sensitivity and scale distribution. In a general way the invention may be considered as a mechanical equivalent of a regenerative vacuum tube circuit.

Figure 2:
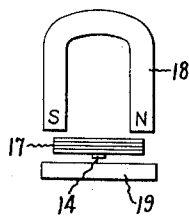
Figure 3:
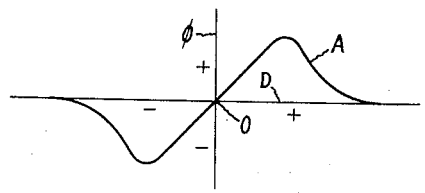
Figure 4:
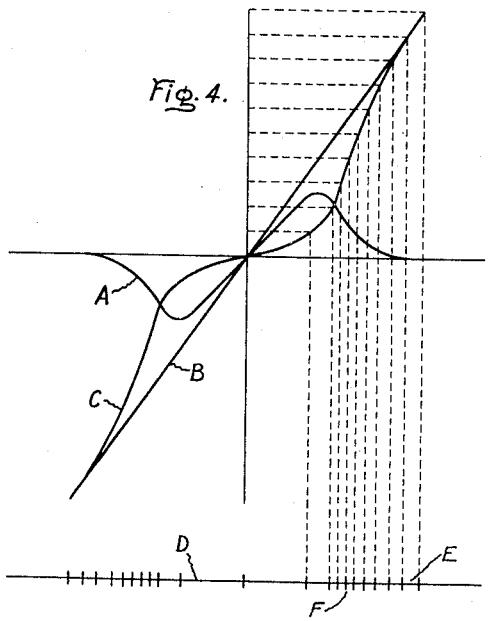
Figure 5:
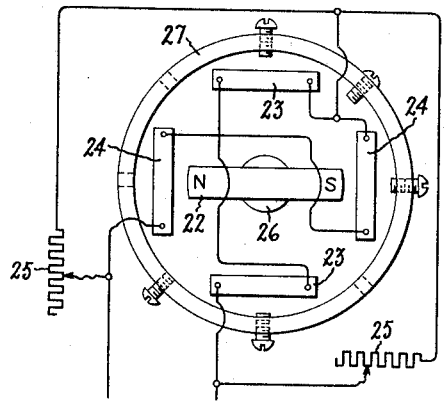

The features of my invention which are believed to be novel and patentable will be pointed out in the claims appended hereto. For a better understanding of my invention, reference is made in the following description to the accompanying drawing in which Fig. 2 represents a curve drawing fluxmeter combination in which a regenerative fluxmeter coil is provided on the deflecting element of the recorder to expand a selected portion of the scale. Fig. 2 represents a right angle view of the regenerative coil and field producing means of Fig. 1. Fig. 3 is a deflection flux distribution curve of the regenerative fluxmeter of Fig. 1. Fig. 4 shows flux deflection curves and the resulting scale distribution for the combination of Fig. 1 which will be referred to in explaining my invention; and Fig. 5 represents a double regenerative unit.

Figure 1:
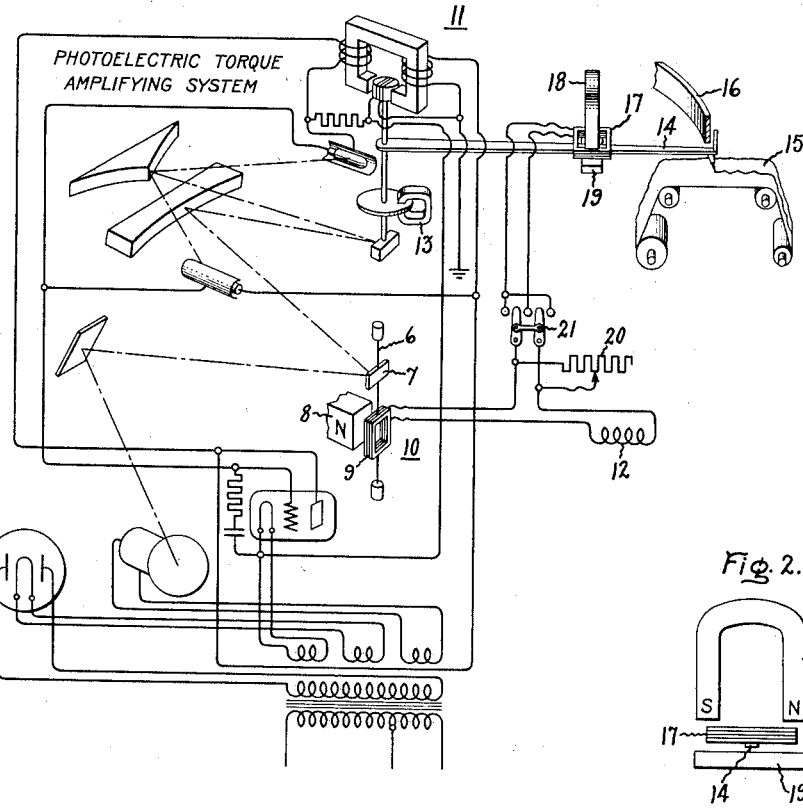

In Fig. 1, I have represented a form of curve drawing fluxmeter in which the measurement deflection of a low torque primary fluxmeter 10 controls a photoelectric cell system to operate a secondary high torque curve drawing meter 11. Nine (9) represents the moving coil of the primary fluxmeter, and 8 its stationery permanent magnet field. This instrument has a torsional suspension 6 and a mirror 7 thereon for transferring the deflection to the photoelectric amplifying system. The photoelectric amplifying system illustrated is described in United States Letters Patent No. 1,897,850, February 14, 1933, to La Pierre, and is only incidentally involved with the present invention. Other torque amplifying systems might be used. It is sufficient for an understanding of the present invention to explain that the photoelectric amplifying system serves to energize the curve drawing instrument 11, so that it will reproduce the deflection of instrument 9 and have sufficient torque to produce a record thereof. The complete details of the primary fluxmeter 10 are not illustrated but may be similar to those described in my United States Letters Patent No. 2,326,252, August 10, 1943, and assigned to the same assignee as the present invention. It is understood that such an instrument produces a deflection proportional to and in a direction dependent upon the change in flux linkages in its moving coil circuit and that the instrument is designed to have a negligible drift of its moving coil system from any position to a different position within its measurement range in accordance with good fluxmeter practice. The instrument 10 has its moving coil connected in series relation with a flux search coil 12 and, except for the regenerative feature of my invention, would produce a deflection strictly proportional to the flux change in coil 12.

The high torque curve drawing instrument 11 is provided with magnetic damping at 13, and likewise, will produce a deflection proportional to and in a direction corresponding to the deflection of the primary instrument 10 and retain such deflection until there is a further change in the position of the moving system of instrument 10.

The high torque instrument is provided with a recording arm 14 having a pen for recording on a chart 15, and may have a pointer extension co-operating with an indicating scale 16. The features which constitute the present invention include a small regenerative coil 17 carried by the recording arm 14 which is or may be connected in series relation with the search coil 12 and coil 9 of the primary fluxmeter 10. Within the range of deflection of arm 14 and corresponding travel of coil 17, there is provided auxiliary field producing means which comprises a permanent magnet 18 and a bar 19 of magnetic material, the two being spaced apart so that the coil 17 may be carried between them as the arm 14 deflects. Hence, there are produced flux changes in coil 17, and the results of such changes are added to or subtracted from the effect of a change in flux in search coil 12 at a selected part of the deflection of instruments 10 and 11. The effect of coil 17 is thus caused to introduce energy variations into the circuit of and to modify the deflection of primary instrument 10 and in turn the deflection of instrument 11. The magnitude of the regenerative energy thus introduced into the energizing circuit of primary instrument 10 may be modified as desired, as for example, placing an adjustable resistance shunt 20 across coil 17.

In the embodiment of the invention illustrated, the regenerative coil is used to expand a selected portion of the scale of the fluxmeter combination or to increase the sensitivity of the system at such selected part of the scale. In Fig. 2, I have illustrated a view of the regenerative coil 17 and field arrangement taken at right angles to the recording arm 14 with the coil 17 at the center of the field. The nature and direction of flux change through coil 17 produced by magnet 18 as the coil is moved past the magnet are illustrated in Fig. 3, where the ordinate φ represents flux and the abscissa D represents angular deflection, zero angle deflection Fig. 3 being represented for the coil and magnet centered as shown in Fig. 2. The zero angular deflection here referred to may be at any point along scale 16. When the coil is at zero angle, the N and S pole fluxes cutting the coil are equal, and the resultant flux is zero, but at this point the flux reverses through the coil and the flux change is a maximum. When the coil 17 moves to the right of the magnet, N pole flux cuts the coil until the coil moves beyond the range of the magnet and the flux gradually dies out. Similarly when the coil is moved to the left from center S pole flux cuts the coil. Curve A, Fig. 3, thus represents the nature of flux change through coil 17 when the coil is moved past magnet 18.

Fig. 4 is the same as Fig. 3 with curves B and C added. In Fig. 4 let the straight line curve B represent the flux change in search coil 12 to produce a uniform angular deflection of instruments 10 and 11, assuming that coil 17 were not connected in the primary flux instrument circuit. Assume further that curve B and curve A taken from Fig. 3 are plotted to the same scale in Fig. 4, so far as their effect on deflection is concerned, and also that coil 17 is connected in the circuit of coil 12 so as to increase rather than decrease the sensitivity over the range of deflection where coil 17 is most effective; namely, when moving past the center of magnet 18. Curve C represents the difference between curves A and B.

Since the deflection is now represented by the summation of curves A and B, it is apparent that in order to produce a uniform rate of deflection of the coil 17 past magnet 18, the rate of change of flux in search coil 12 must be nonuniform, and the nonuniformity required is represented by curve C. In other words, over the central range of deflection past coil 17 the rate of change of flux in search coil 12 must be less than it would normally be to produce the same rate of deflection of the pointer. The result is that the sensitivity over such range of deflection is increased or the scale 16 of the instrument is expanded over this range, and the expansion of the scale is represented in Fig. 4 at D. The graduations of the scale at D, Fig. 4, represent the points of deflection of the pointer for equal increments of flux change in coil 12. The medium spaced graduations at E represent the normal scale distribution, and the closely spaced graduations at F represent ranges of decreased sensitivity.

It is now apparent that if I reversed the circuit to feedback coil 17 by a reversing switch 21 without making any other changes, the sensitivity and scale distribution would be decreased thereby at D and increased at F. Thus I may decrease or increase the sensitivity by means of my invention at any desired point of the scale and I may also expand the scale at one point and restrict it at another selected point by means of this invention. The extent to which the sensitivity is increased or decreased in any given case may be controlled by controlling the magnitude of the regenerative flux change. Thus in Fig. 1 this is controlled by variation in the resistance 20 in shunt to the coil 17.

It is not essential that the regenerative coil be mounted on the moving element or that the moving element be mounted on the pointer arm, and in Fig. 5, I have represented at 26 an extended end view of the shaft of recorder 11 with a small permanent magnet 22 cemented or otherwise mounted thereon so as to rotate in coupling relation with two sets of stationary regenerative coils 23 and 24. Coils 23 will be effective for one part of the scale as when the magnet 22 is rotated past a position of alignment with the flux axis of coils 23, and coils 24 for another part of the scale. Both sets of coils will be partially effective at an intermediate point of the scale. The coils may be connected in series in the primary fluxmeter circuit, and either set may be controlled by means of adjustable resistance 25 in shunt therewith or completely short-circuited and rendered ineffective. 27 represents a magnetic flux return ring outside of the coils and the sensitivity and scale distribution may be further modified by adjustable magnetic screws positioned radially about the ring. For example, the presence of the screws which are in line with the flux axis of coils 23 decreases the reluctance in the flux path of these coils and consequently makes these coils more effective, and adjustment of the screws inwardly would further decrease the reluctance and increase the effectiveness of the coils.

In all cases where the invention is applied it will, of course, be understood that the recording or other secondary meter which operates the regenerative control will have sufficiently high torque that the small load imposed thereon by the operation of the regenerative control will have no direct effect on its deflection.

In accordance with the provisions of the patent statutes, I have described the principle of operation of my invention together with the apparatus which I now consider to represent the best embodiment thereof, but I desire to have it understood that the apparatus shown is only illustrative and that the invention may be carried out by other means.

What I claim as new and desire to secure by Letters Patent of the United States, is:

1. In a measuring system a primary deflecting type measuring instrument, a secondary deflecting type instrument, means connected between said two instruments for causing the secondary measuring instrument to have a deflection proportional to that of the primary instrument, means for altering the deflections of said two instruments including an electrical energizing circuit for the primary instrument, and means operated by the secondary instrument in response to its deflection for introducing energy variations into said energizing circuit.

2. In a measuring system a primary deflection type electrical measuring instrument, a measurement circuit to which said instrument is connected for measurement purposes, a secondary deflection type measuring instrument, means connected between said instruments for causing the deflection of the secondary instrument to be proportional to that of the primary instrument, and means for modifying the deflection of both instruments comprising means controlled in response to the deflection of the secondary instrument for introducing energization modifying variations into the energizing circuit of said primary instrument.

3. In a measuring system a primary low torque electrical measuring instrument of the deflection type, a high torque secondary electrical measuring instrument of the deflection type, a torque amplifying system connected between said instruments to cause the secondary instrument to deflect in proportion to the primary instrument, a measurement circuit connected to said primary instrument and a coil in which an electromotive force is generated in response to the deflection of the secondary instrument connected in series in said measurement circuit for the purpose of modifying the deflections of both instruments during a measurement operation.

4. In a flux measuring system a primary low torque flux measuring instrument, a flux measuring pickup coil connected in series with said primary instrument, a high torque secondary instrument designed to repeat the deflections of said primary instrument, amplifying means controlled in response to the deflection of said primary instrument for energizing said secondary instrument, a second flux pickup coil and a permanent magnet, one of which is stationary and the other of which is moved relative to the other by the deflection of said secondary instrument to vary the extent and direction of flux through said second flux pickup coil, and connections for including said second flux pickup coil in series with the measuring flux pickup coil and the primary fluxmeter to modify the deflections of said instruments at selected parts of their deflection ranges.

5. A measuring system comprising a low torque primary electrical measuring instrument of the deflection type, a high torque secondary electrical measuring instrument of the deflection type, an electrical amplifying system connected between the two instruments for causing the secondary instrument to deflect in proportion to that of the primary instrument, a coil carried by the moving part of the secondary instrument, a permanent magnet past which said coil is moved when the secondary instrument is deflected for producing a voltage in said coil, connections for introducing the voltage of such coil into an energizing circuit of the primary instrument for modifying the deflections of both instruments during a measuring operation, and means for adjusting the magnitude of such deflection modifying means.

6. An electrical measuring instrument of the deflection type having a deflecting arm and a scale relative to which said arm is deflected, an energizing circuit for said instrument, and means for amplifying the scale distribution of said instrument comprising means controlled in response to the deflection of said instrument for modifying the energization of said instrument in a predetermined manner over a selected part of its deflection range.

THEODORE A. RICH.